United States Patent
Wang et al.

(10) Patent No.: US 9,285,882 B2
(45) Date of Patent: Mar. 15, 2016

(54) HAPTIC FEEDBACK DEVICE

(71) Applicants: Hongxing Wang, Shenzhen (CN); Rongguan Zhou, Shenzhen (CN); Lubin Mao, Shenzhen (CN)

(72) Inventors: Hongxing Wang, Shenzhen (CN); Rongguan Zhou, Shenzhen (CN); Lubin Mao, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 14/269,328

(22) Filed: May 5, 2014

(65) Prior Publication Data

US 2014/0333181 A1 Nov. 13, 2014

(30) Foreign Application Priority Data

May 7, 2013 (CN) ...................... 2013 2 0241742 U

(51) Int. Cl.
| | |
|---|---|
| *H01L 41/09* | (2006.01) |
| *G06F 3/01* | (2006.01) |
| *B06B 1/06* | (2006.01) |
| *G06F 3/16* | (2006.01) |

(52) U.S. Cl.
CPC .............. *G06F 3/016* (2013.01); *B06B 1/0603* (2013.01); *G06F 3/167* (2013.01)

(58) Field of Classification Search
CPC .... H04R 17/00; B06B 1/0603; H01L 41/053; H03H 9/1021
USPC .................... 310/311, 322, 328, 348
See application file for complete search history.

(56) References Cited

U.S. PATENT DOCUMENTS

| | | | | |
|---|---|---|---|---|
| 8,310,457 | B2* | 11/2012 | Faubert | G06F 1/1626 178/18.01 |
| 2006/0250762 | A1* | 11/2006 | Yang | G06F 1/1626 361/679.26 |
| 2008/0100568 | A1* | 5/2008 | Koch | G06F 3/016 345/156 |
| 2010/0079379 | A1* | 4/2010 | Demuynck | G06F 3/016 345/169 |
| 2010/0090814 | A1* | 4/2010 | Cybart et al. | 340/407.2 |
| 2010/0134059 | A1* | 6/2010 | Ha | H02P 29/028 318/400.31 |
| 2011/0053653 | A1* | 3/2011 | Tho | H04M 1/0202 455/566 |
| 2011/0134059 | A1* | 6/2011 | Paleczny | G06F 3/016 345/173 |
| 2012/0299448 | A1* | 11/2012 | Liu et al. | 310/348 |

* cited by examiner

*Primary Examiner* — Shawki S Ismail
*Assistant Examiner* — Bryan Gordon
(74) *Attorney, Agent, or Firm* — IPro, PLLC; Na Xu

(57) ABSTRACT

Disclosed is a haptic feedback device. The device includes a first frame, a second frame connected with the first frame, a display mounted in the first frame, an actuator for driving the display to vibrate thereby generating sound, and a connecting unit for connecting the first frame and the second frame.

9 Claims, 6 Drawing Sheets

HAPTIC FEEDBACK DEVICE

FIELD OF THE INVENTION

The disclosure described herein relates generally to sound generating devices, and more particularly, to a haptic feedback device capable of providing both haptic and audible feedback to a user.

DESCRIPTION OF RELATED ART

In accordance with the development of a mobile communication technology, terminals such as cellular phones, personal digital assistances (PDAs), and navigations can serve as a unit that simply displays character information as well as a unit for providing various and complex multi-media contents such as audio, moving picture, radio internet web browser, or the like. Therefore, electronic information terminals having a limited size require a larger display screen, such that a display device using a touch screen has become prominent.

As is well known, in a portable electronic device such as a cellular phone, a game machine, or the like, a piezoelectric vibration module has been employed widely. Particularly, a piezoelectric vibration module performing the sound function has been mounted on a screen of a mobile device.

However, while the screen is driven to vibrate thereby generating sounds by the piezoelectric vibration module, the screen is possible to produce excessive amplitude which could separate the screen from the frame on which the screen is fixed.

Therefore, an improved haptic feedback device is provided in the present disclosure to solve the problem mentioned above.

Figure 1:
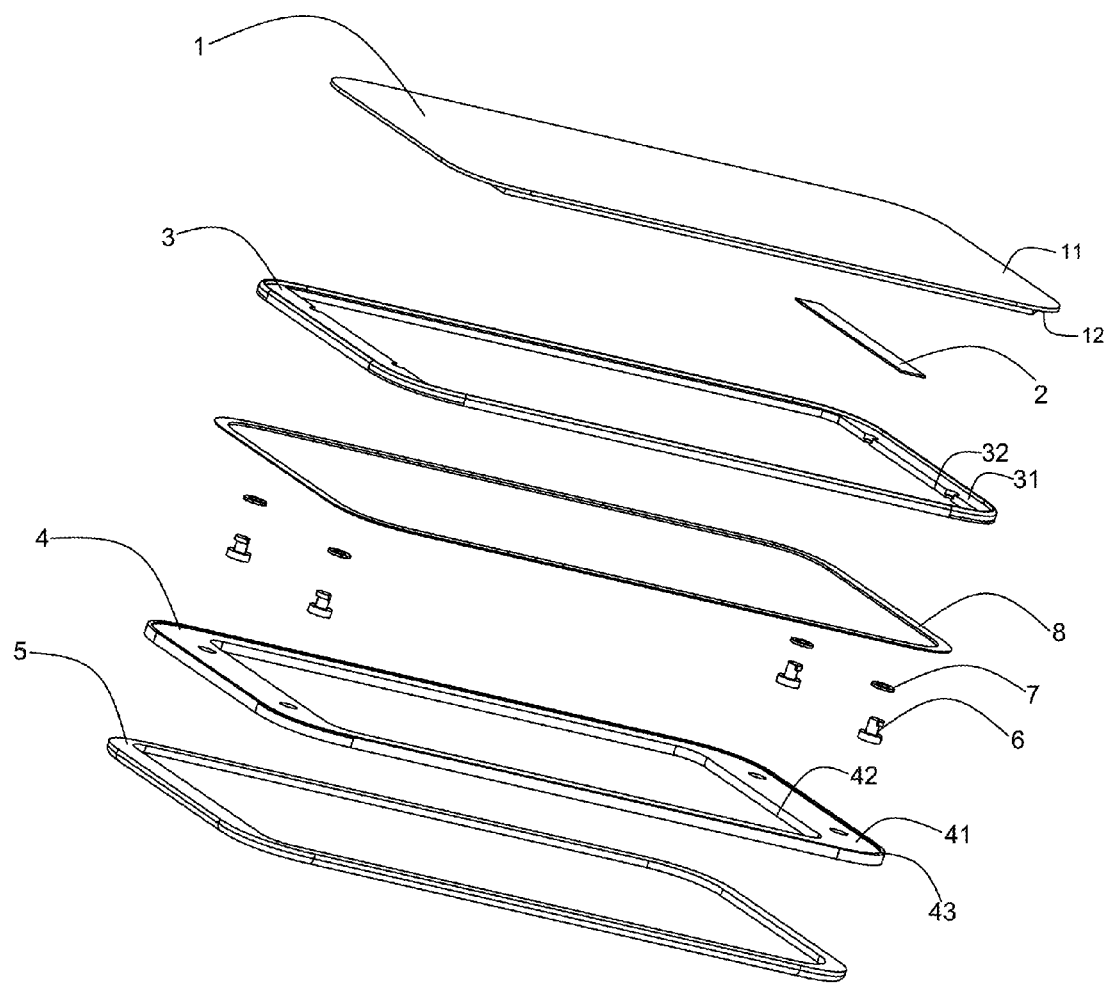
FIG. 1 illustrates an exploded view of a haptic feedback device in accordance with an exemplary embodiment of the present disclosure.

Many aspects of the embodiment can be better understood with reference to the drawings mentioned above. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

Reference will now be made to describe the exemplary embodiment of the present invention in detail.

Referring to FIG. 1, the present disclosure provides a haptic feedback device 100 comprising a display 1 having a first surface 11 and a second surface 12 opposite to the first surface 11, an actuator 2 attached with the second surface 12 for driving the display 1 to vibrate thereby generating sound, a second frame 4 having a fifth surface 41 and a sixth surface 42 opposite to the fifth surface 41, a first frame 3 having a third surface 31 and a fourth surface 32 opposite to the third surface 31, a third frame 5, at least one connecting unit 6 for connecting the first frame 3 to the second frame 4 thereby preventing the first frame 3 departing from the second frame 4 during vibration, a first elastic gasket 7 and a second elastic gasket 8 sandwiched between the fourth surface 32 and the fifth surface 41. The second surface 12 of the display 11 is connected with the third surface 31 of the first frame 3. The second frame 4 is disposed between the first frame 3 and the third frame 5. The connecting unit 6 can be made of rigid plastic or metallic like aluminum alloy. In this exemplary embodiment, the actuator 2 is made of piezoelectric ceramic vibrator, and the piezoelectric ceramic vibrator transmits the deformation thereof to the display 1 and drives the display to vibrate thereby generating sounds. The actuator 2 can also be other devices that can drive the display to vibrate.

Figure 2:
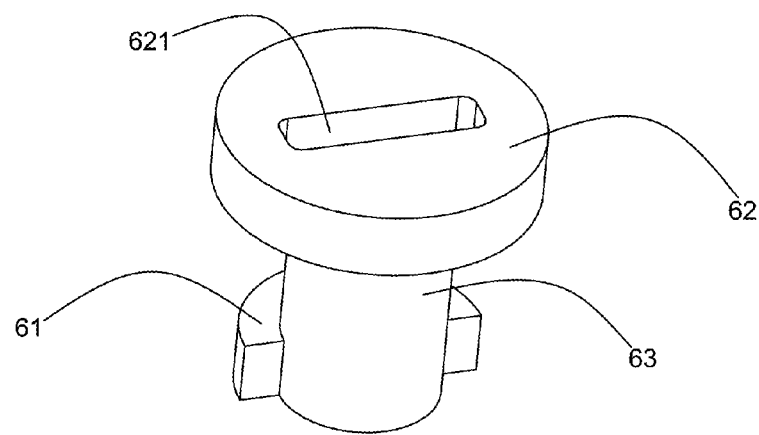
FIG. 2 illustrates an isometric view of a connecting unit of the haptic feedback device in FIG. 1.

Referring to FIG. 2, the connecting unit 6 has a first end 61, a second end 62 having a groove 621 in a top surface thereof for cooperating with an external tool, and a connecting part 63 connecting the first end 61 and the second end 62. The first end 61 is configured to be a semi-cylinder, and the second end 62 is configured to be a cylinder. A diameter of the second end 62 is greater than a diameter of the first end 61.

Figure 3:
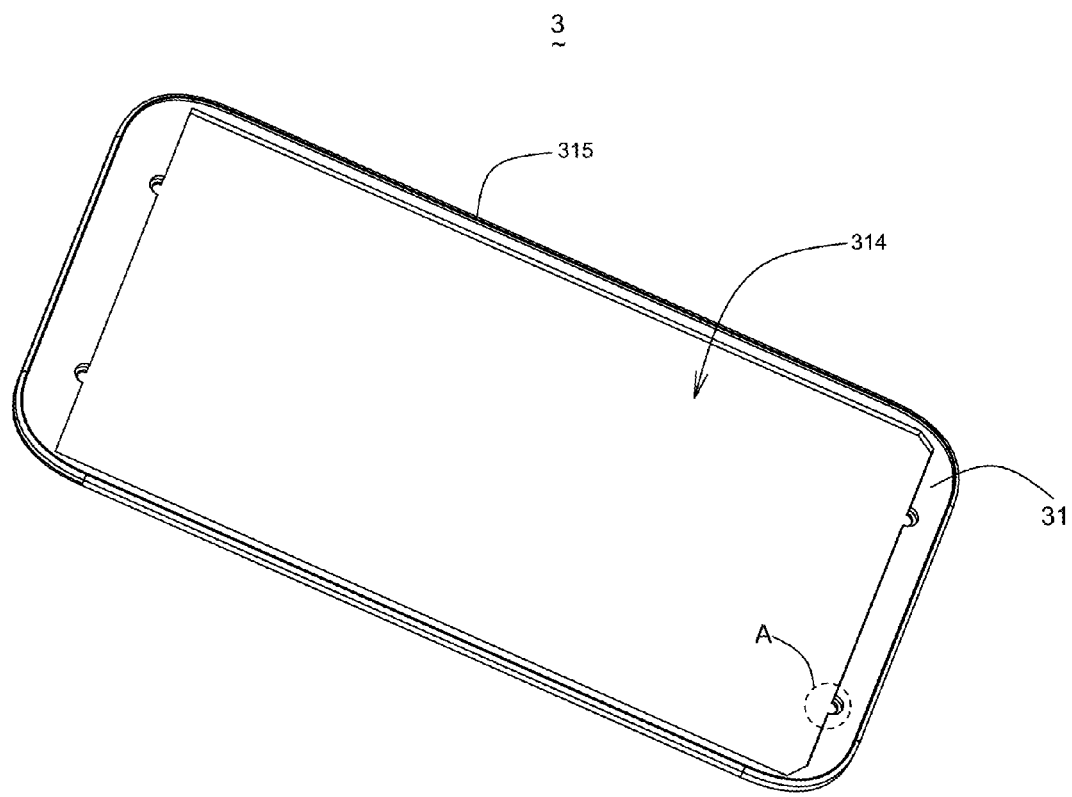
FIG. 3 illustrates an isometric view of a first frame of the haptic feedback device in FIG. 1.
Figure 4:
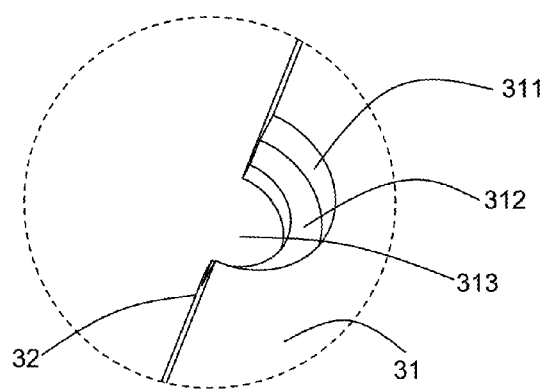
FIG. 4 is an enlarged view of part A in FIG. 3.

Referring to FIGS. 3-4, the first frame 3 further has a first body portion 315 and a though accommodating hole 314 surrounded by the first body portion 315. The third surface 31 and the fourth surface 32 are provided on the first body portion 315, respectively. The first body portion 315 further has a first receiving hole 313 drilled from the third surface 31 completely through the fourth surface 32 and communicated with the though accommodating hole 314. The first frame 3 further has a first receiving concave 3131 communicated with the first receiving hole 313. The first receiving concave 3131 has a first inner wall 311 extending from the third surface 31 towards the fourth surface 32 and a first extending wall 312 extending from the first inner wall 311 towards the though accommodating hole 314. In alternative embodiment, the first extending wall may be disposed between the third surface 31 and the fourth surface 32.

Figure 5:
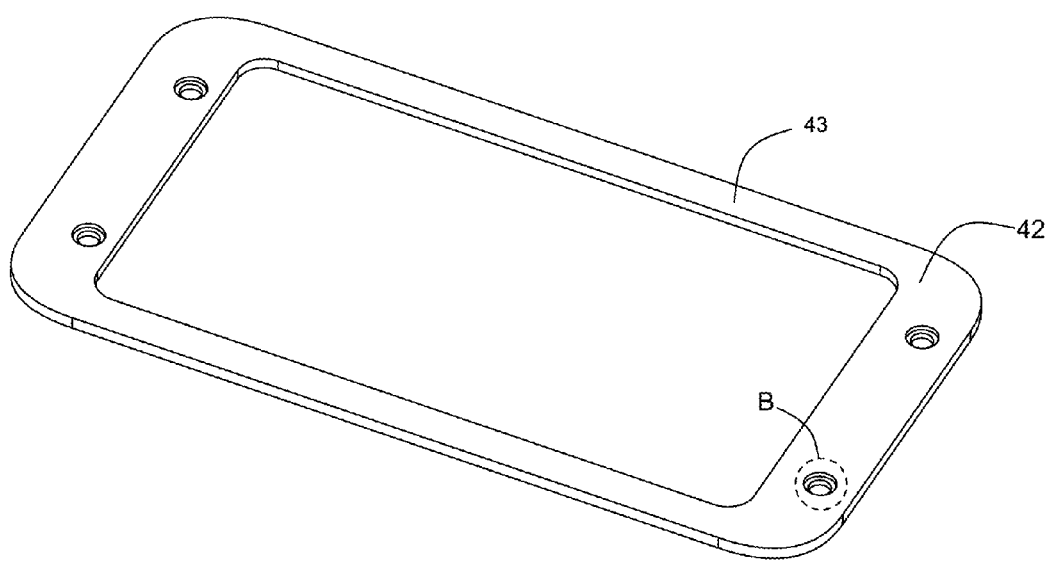
FIG. 5 illustrates an isometric view of a second frame of the haptic feedback device in FIG. 1.
Figure 6:
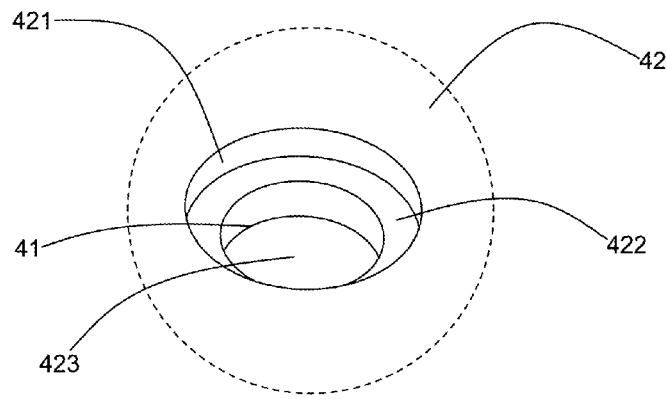
FIG. 6 is an enlarged view of part B in FIG. 5.
Figure 7:
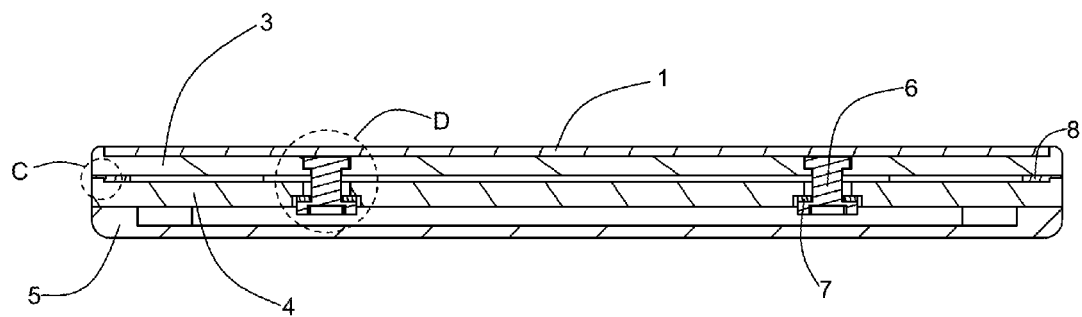
FIG. 7 illustrates a cross-section view of the haptic feedback device.
Figure 8:
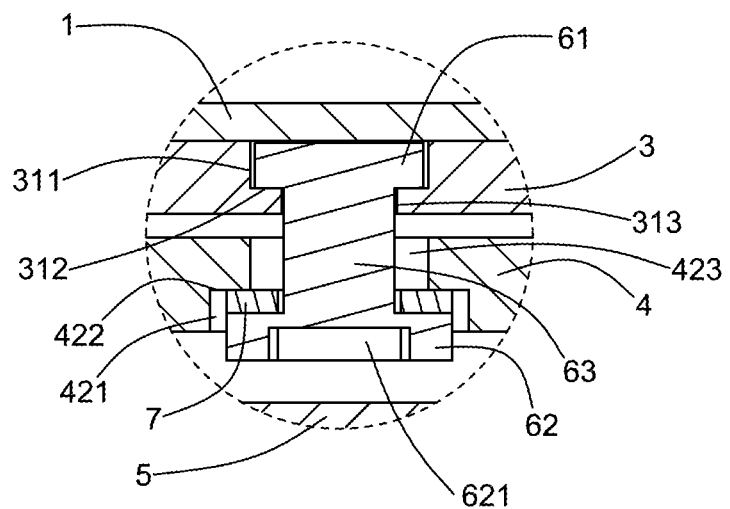
FIG. 8 is an enlarged view of part D in FIG. 7.

Referring to FIGS. 5-6, the second frame 4 has a second body portion 43, the fourth surface 41 and the fifth surface 42 are provided on the second body portion 43 respectively. The second body portion 43 further has a second receiving hole 423 drilled from the fifth surface 41 completely through the sixth surface 42. The second frame 4 has a second receiving concave 4231 communicated with the second receiving hole 423. The second receiving concave 4231 has a second inner wall 421 extending from the sixth surface 42 towards the fifth surface 41 and a second extending wall 422 extending from the second inner wall 421 towards the second receiving hole 423. Referring to FIGS. 7-8, the first end 61 is received in the first receiving concave 3131 and engages with the first extending wall 312 of the first receiving concave 3131, and the second end 62 is received in the second receiving concave 4232 and engages with the second extending wall 422. Thus, the first frame 3 is connected with the second frame 4 by the connecting unit 6, which can prevent the first frame 3 from departing from the second frame 4 while the display 1 is vibrating together with the first frame 3, and can improve the mechanical reliability of the haptic feedback device. In this situation, the connecting unit 6 is formed as an integral one piece party. Alternatively, the first receiving concave and the second receiving concave can be omitted, in case of which the connecting part 63 is received in the first receiving hole and the first end engages with the third surface, and the second end engages with the sixth surface. Accordingly, the connecting unit 6 is formed as two parts on installing ground.

Figure 9:
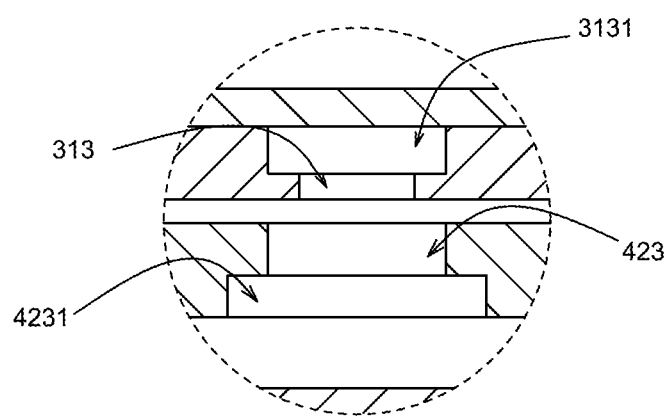
FIG. 9 is a cross-section view of the first receiving hole and the second receiving hole.

Referring to FIG. 9, the first receiving hole 313 has a diameter smaller than that of the first receiving concave 3131, and the second receiving concave 4231 has a diameter greater than that of the second receiving hole 423. It should be understood that the diameter of the second receiving 423 should be greater than that of the first end 61. When assembled, the first end 61 of the connecting unit 6 is inserted into the second receiving hole 423 until the second end 62 engages with the second extending wall 421, and rotating the connecting unit 6 if necessary until the first end 61 engages with the first extending wall 312. The shapes of the first end 61 and the groove 621 in the second end 62 make it more convenient to finish the assembly.

As an exemplary embodiment, referring to FIG. 8, the first elastic gasket 7 sandwiched between the second end 62 and the second extending wall 422. The first elastic gasket 7 is capable of cushioning and protecting the display 1 and the haptic feedback device.

Figure 10:
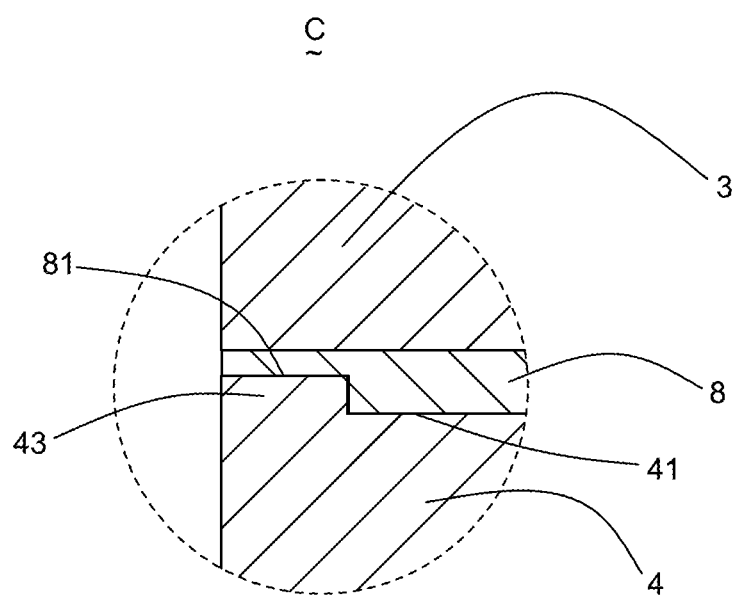
FIG. 10 is an enlarged view of part C in FIG. 7.

As an exemplary embodiment, referring to FIG. 10, the second frame 4 has a mounting flange 43 extending from the fifth surface 41 on its outer boundary, the second elastic gasket 8 has a concave part 81 engaging with the mounting flange 43 on its outer boundary which makes the assembling of the second elastic gasket 8 be more efficient and accuracy. The first elastic gasket 7 and the second elastic gasket 8 can be made of elastic materials like silicone rubber or foam.

While the present disclosure has been described with reference to the specific embodiment, the description of the disclosure is illustrative and is not to be construed as limiting the disclosure. Various of modifications to the present disclosure can be made to the exemplary embodiment by those skilled in the art without departing from the true spirit and scope of the disclosure as defined by the appended claims.

What is claimed is:

1. A haptic feedback device, comprising:
   a first frame having a third surface, a fourth surface, a first receiving hole drilled from the third surface completely through the fourth surface and a first receiving concave communicating with the first receiving hole, the first receiving concave having a first inner wall extending from the third surface towards the fourth surface and a first extending wall extending from the first inner wall towards the first receiving hole;
   a second frame connected with the first frame and having a fifth surface, a sixth surface and a second receiving hole drilled from the fifth surface completely through the sixth surface;
   a display mounted with the first frame and having a first surface and a second surface opposite to the first surface;
   an actuator attached with the second surface for driving the display to vibrate thereby generating sound, wherein
   the haptic feedback device further comprising a connecting unit having a first end received in the first receiving concave and engaged with the first extending wall, a second end and a connecting part for connecting the first end and the second end, the connecting part being received in the first receiving hole and the second receiving hole, and the first end engaging with the first frame, the second end engaging with the second frame.

2. The haptic feedback device as described in claim 1, wherein the first frame has a first body portion and a through accommodating hole surrounded by the first body portion for accommodating the display, the first receiving hole communicates with the through accommodating hole completely.

3. The haptic feedback device as described in claim 1, wherein the second frame further comprises a second receiving concave communicating with the second receiving hole, the second receiving concave has a second inner wall extending from the sixth surface towards the fifth surface and a second extending wall extending from the second inner wall towards the second receiving hole, the second end is received in the second receiving concave and is engaged with the second extending wall.

4. The haptic feedback device as described in claim 3 further comprising a first elastic gasket sandwiched between the second end and the second extending wall.

5. The haptic feedback device as described in claim 1, wherein the second end of the connecting unit has a groove for cooperating with an external tool.

6. The haptic feedback device as described in claim 1 further comprising a second elastic gasket sandwiched between the first frame and the second frame.

7. The haptic feedback device as described in claim 6, wherein the second frame has a mounting flange extending from a periphery of the fifth surface, the second elastic gasket has a concave part engaging with the mounting flange.

8. The haptic feedback device as described in claim 1 further comprising a third frame connected with the second frame.

9. The haptic feedback device as described in claim 1, wherein the actuator is made of piezoelectric ceramic.

* * * * *